United States Patent [19]

Coffey et al.

[11] Patent Number: 4,721,623
[45] Date of Patent: Jan. 26, 1988

[54] METHOD OF IMPARTING AN OVEN ROASTED COLOR TO A MEAT PRODUCT

[75] Inventors: Thomas H. Coffey; Gene G. Suess, both of Madison, Wis.

[73] Assignee: Oscar Mayer Foods Corporation, Madison, Wis.

[21] Appl. No.: 642,014

[22] Filed: Aug. 20, 1984

[51] Int. Cl.$^4$ .............................................. A23L 1/275
[52] U.S. Cl. ................................... 426/250; 426/641; 426/644
[58] Field of Search ............... 426/250, 262, 263, 268, 426/641, 652, 646, 644, 540, 312

[56] References Cited

U.S. PATENT DOCUMENTS 3,139,346  6/1964  Meusel et al. ................. 426/250 X
3,503,760  3/1970  Allen .................................. 426/312
4,252,832  2/1931  Moody ............................... 426/241

Primary Examiner—Arthur L. Corbin
Attorney, Agent, or Firm—Joseph T. Harcarik; Thomas R. Savoie; Daniel J. Donovan

[57] ABSTRACT

An oven-roasted color is imparted to a meat product which is cooked at a temperature below that at which natural browning occurs. This is accomplished by atomizing an aqueous solution of caramel coloring in an environment sufficiently humid to prevent spray drying of the atomized solution, contacting the meat product with the atomized caramel coloring solution in that humid environment, and exposing the surface of the meat product to a temperature sufficiently high to bind the caramel coloring to the meat surface.

7 Claims, No Drawings

METHOD OF IMPARTING AN OVEN ROASTED COLOR TO A MEAT PRODUCT

FIELD OF THE INVENTION

This invention relates in general to techniques for imparting color to meat products and in particular to a technique for applying caramel coloring to a meat product which is cooked below the temperature at which natural browning occurs.

BACKGROUND OF THE INVENTION

In commercial oven cooking of meat to be packaged and store, cooking temperatures are generally kept low, with the internal temperature of the meat usually kept below 160° F. This prevents the meat from drying out, but fails to provide the aesthetically pleasing browning of the exterior surface of the meat that comes with home oven cooking where the oven temperature ranges from 350° F. and up.

One proposed solution to this problem has been to dip the meat in or baste it with an aqueous solution of caramel coloring prior to cooking. This technique, however, can result in uneven and blotchy coloring on each piece of meat and does not yield uniform color from one piece of meat to the next and requires handling of the messy solution and/or the messy treated meat. Moreover, many caramel colors react with meat cookout juices and form a black precipitate on meat that has been dipped in a solution of such a caramel color.

SUMMARY OF THE INVENTION

According to the present invention, an oven-roasted coloration is imparted to a meat product by atomizing an aqueous solution of caramel coloring in an environment sufficiently humid to prevent spray drying of the atomized solution, contacting the meat product with the atomized caramel coloring solution in that humid environment, and exposing the surface of the meat product in an oven to a temperature sufficiently high to bind the caramel coloring to the meat surface.

This method produces even coloration on each meat piece and also from one piece to the next, and avoids formation of the black precipitate on the surface of the meat product which is found on pieces that have been dipped in caramel coloring solution. The atomization process reduces the need for direct handling of the solution and since the atomization environment can be the same as the cooking environment, the need for handling the treated meat product is greatly reduced.

DESCRIPTION OF THE PREFERRED EMBODIMENTS

The aqueous caramel coloring solution used in the present invention is prepared by mixing caramel coloring powder with water. Such caramel powders are well-known in the art as caramel sugar, caramel powder, caramel color, and the like, and are readily commercially available. Any amount of caramel coloring up to 50 percent by weight may be used in the solution. A preferred amount is 12–50 percent by weight of the caramel coloring solution, more preferably 13–25 percent by weight. Increasing the caramel coloring content of the solution will increase the amount of coloration of the solution (and thus of the meat product) and the viscosity of the solution.

The caramel coloring solution may be atomized by any of a number of means well-known in the art so that the droplet size is such that the droplets are suspended in the air to form a fog. A preferred atomization method is with the use of a two-fluid air/liquid atomizing nozzle. When a 13 weight percent caramel coloring solution is used, it is preferably forced through the nozzle at 0.7 gallon per hour along with air at 65 psi. Other atomization methods are disclosed in U.S. Pat. No. 3,503,760 issued to Allen, the disclosure of which is incorporated herein by reference in its entirety.

Atomization should be done in an environment sufficiently humid to prevent spray drying of the caramel coloring coloring solution. Spray drying occurs when the water in the droplets evaporates before the droplets coalesce onto the surface of the meat. To prevent spray drying, the relative humidity of the atomization environment is preferably at least 50 percent.

The meat to be used in the present invention may be any type to which color is desired to be imparted, including beef, pork, and poultry. Poultry is a preferred meat and turkey is a preferred poultry meat. The process of the invention can be used to impart color to raw, cooked hot, or cooked chilled meat. If the meat has skin on the surface, such as with turkey breasts, it is preferable to contact cooked meat with the atomized fog of caramel coloring solution. Otherwise, if raw meat with skin is contacted with the fog, skin shrinkage during cooking may cause uneven coloration.

Either after or during contacting, the surface of the meat product should be exposed to a temperature sufficient to bind the caramel color to the surface of the meat. This temperature is preferably at least 150° F. Of course, if this binding temperature is sufficiently high to impart coloration to the meat in the absence of any caramel coloring, the application of the caramel coloring solution would be unnecessary. The coloration imparted to the meat may be increased by increasing the caramel coloring content of the solution and/or by increasing the time of exposure to the atomized caramel coloring solution fog, and decreased by decreasing the caramel coloring content and/or the time of exposure. Exposure times of between 20 and 45 minutes have been found to be useful.

In a preferred embodiment, the meat product is cooked before contacting with the atomized caramel coloring solution. In an especially preferred embodiment, the meat product is cooked in humid oven (less than for example, at 170° F. dry bulb and 168° F. wet bulb for a time such that the internal temperature of the meat does not exceed 165° F.), and the caramel coloring solution fog is introduced into the oven through one or more atomization nozzles at or near the end of the cooking process. This minimizes the required handling of the treated meat product.

The invention is further described by the following example:

EXAMPLE

A solution of 2 lbs Twitchell T-717 caramel powder and 13 pounds water is prepared for introduction as atomized for into the oven.

A turkey breast is place on a rack in a 700 cubic ft. oven and cooked at 160° F. dry bulb, 158° F. wet bulb for 2 hours, and then at 170° F. dry bulb, 168° F. wet bulb until the internal temperature of the turkey breast is 155° F. (approximately 15 minutes). The oven is turned off (but not opened) and 1.05 gallons (approximately 9 lbs.) of the solution is introduced to the oven through two atomizing nozzles at 0.7 gallons per hour for each nozzle along with air at 65 psi over a period of 45 minutes. The turkey breast is then removed from the oven. The cooked turkey breast has a golden oven-roasted color and is suitable for packaging and storing.

The invention has been described in detail with particular reference to preferred embodiments thereof, but it will be understood that variations and modifications can be effected within the spirit and scope of the invention.

What is claimed is:

1. A method of imparting an oven-roasted coloration to a meat product comprising the steps of:
   cooking said meat product,
   atomizing an aqueous solution of caramel coloring, said aqueous solution comprising 12–50 weight percent caramel coloring, in an environment sufficiently humid to prevent spray drying of the atomized solution,
   contacting said cooked meat product with the atomized caramel coloring solution in said humid environment, and
   exposing the surface of said cooked meat product in an oven to a temperature sufficiently high to bind the caramel coloring to the surface of said meat product.

2. The method of claim 1 wherein said meat product comprises poultry meat.

3. The method of claim 2 wherein said poultry meat comprises turkey meat.

4. The method of claim 1 wherein said meat product comprises pork meat.

5. The method of claim 1 wherein said aqueous caramel coloring comprises 13 weight percent caramel coloring, said atomizing step comprises forcing said solution through an atomizing nozzle at 0.7 gallons per hour along with air at 65 psi, and said environment has a relative humidity of at least 50 percent.

6. The method of claim 1 wherein said temperature of said exposing step is at least 150° F.

7. The method of claim 1 wherein said cooking step comprises heating said meat product in an oven with a dry bulb temperature of less than 170° F. for a time such that the internal temperature of said meat product does not exceed 165° F.

* * * * *